United States Patent [19]

Cheremisinoff

[11] 3,944,402
[45] Mar. 16, 1976

[54] AIR POLLUTION CONTROL APPARATUS AND PROCESS

[75] Inventor: Paul Cheremisinoff, Closter, N.J.

[73] Assignee: Engelhard Minerals and Chemicals Corporation, Murray Hill, N.J.

[22] Filed: May 6, 1974

[21] Appl. No.: 467,098

[52] U.S. Cl. .................. 55/92; 55/94; 55/223; 55/233; 55/238; 261/79 A; 261/98; 261/116; 261/117; 261/118

[51] Int. Cl.² .................... B01D 47/06

[58] Field of Search .......... 55/233, 223, 90, 92, 94, 55/235–238, 459, 337; 261/98, 79 A, 116–118

[56] References Cited
UNITED STATES PATENTS

| | | | |
|---|---|---|---|
| 3,324,632 | 6/1967 | Berneike et al. | 261/79 A |
| 3,435,598 | 4/1969 | Couller et al. | 55/459 |

FOREIGN PATENTS OR APPLICATIONS

| | | | |
|---|---|---|---|
| 2,528 | 2/1927 | Australia | 55/233 |

Primary Examiner—Bernard Nozick

[57] ABSTRACT

Pollution control apparatus is provided for use in scrubbing a gas, which is normally vented to the atmosphere, with a liquid, which apparatus embodies in one unit a section to remove solid particulates and entrained liquid from the gas, as well as a packed tower scrubbing section for removing noxious gaseous components from the gas. The apparatus is comprised of an outer shell; and an inner shell disposed within and spaced from the outer shell, the inner shell defining an inner contact zone and the space between the inner shell and the outer shell defining an outer contact zone; liquid feed means for introducing liquid into the inner contact zone; gas feed means for introducing a gas into contact with the liquid in the inner contact zone and for introducing the gas into the outer contact zone; outlet means for liquid; and outlet means for processed gas. The inner contact zone preferably includes a packing material.

In addition, a process for scrubbing of a gas with a liquid is provided wherein apparatus as described above is employed.

9 Claims, 10 Drawing Figures

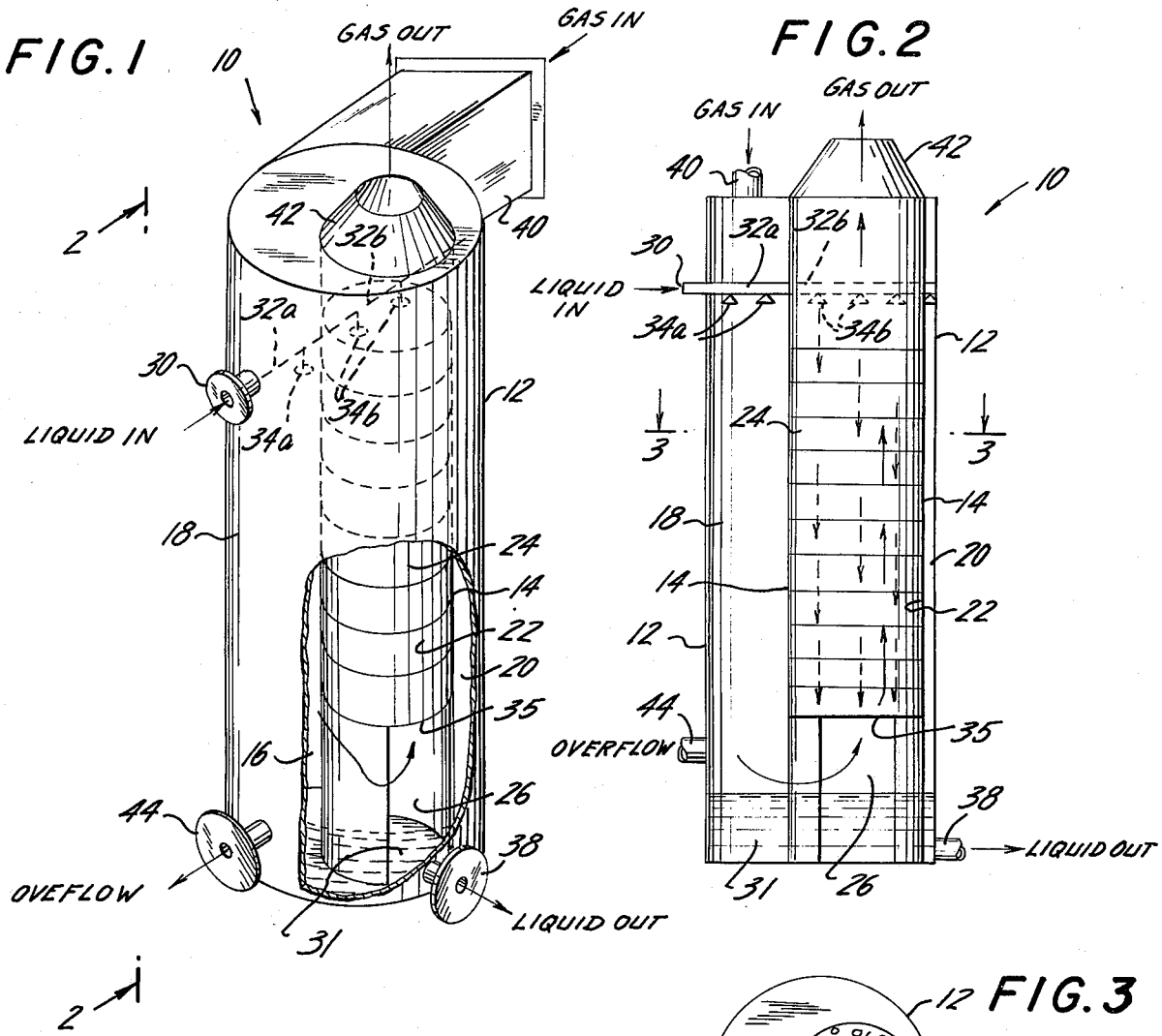

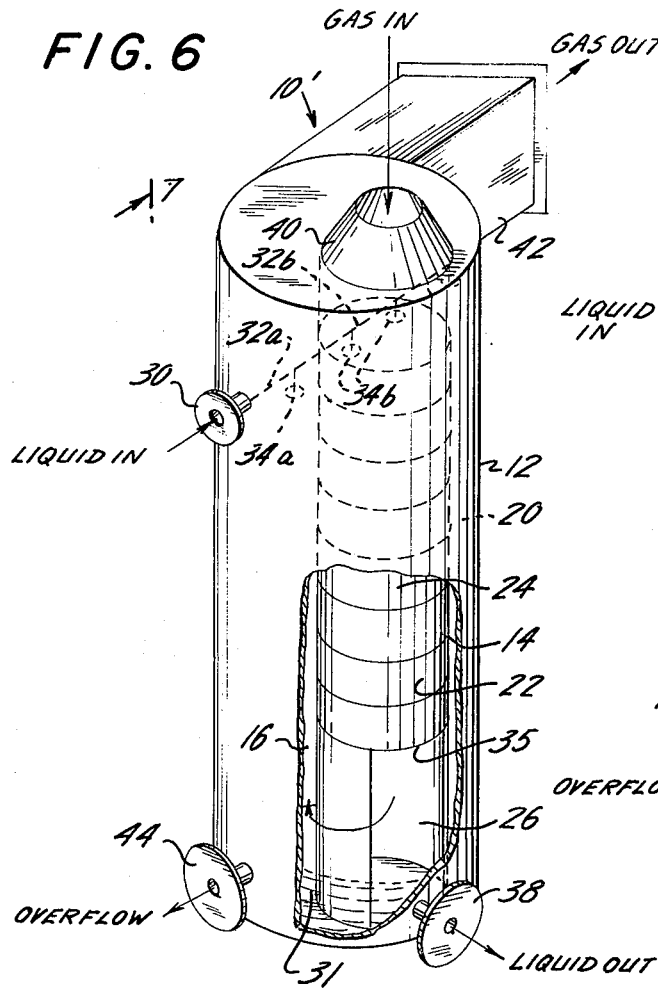
FIG. 6
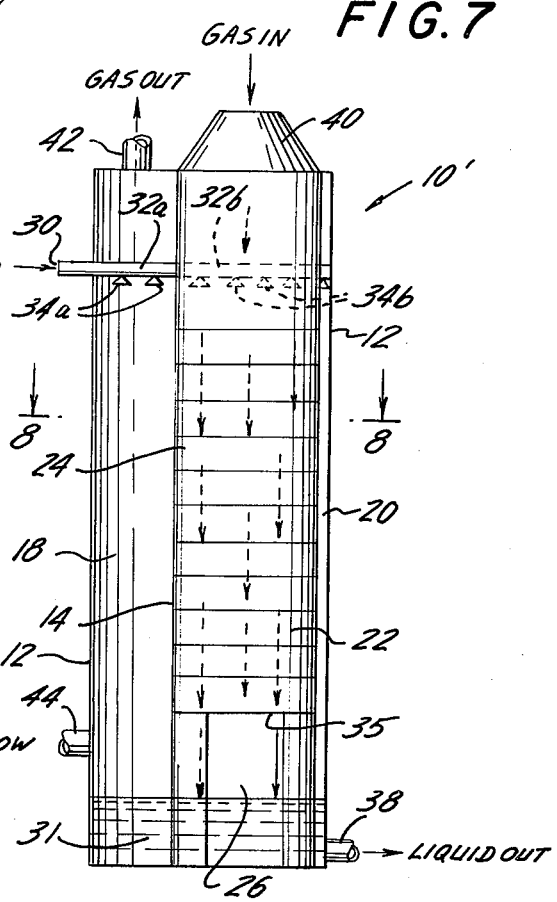
FIG. 7
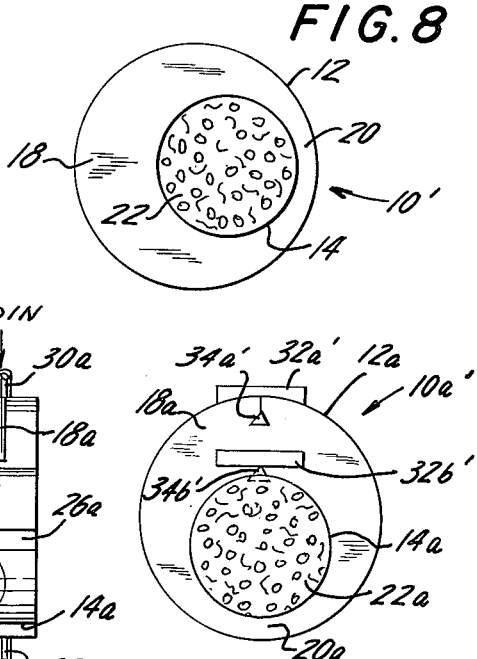
FIG. 8
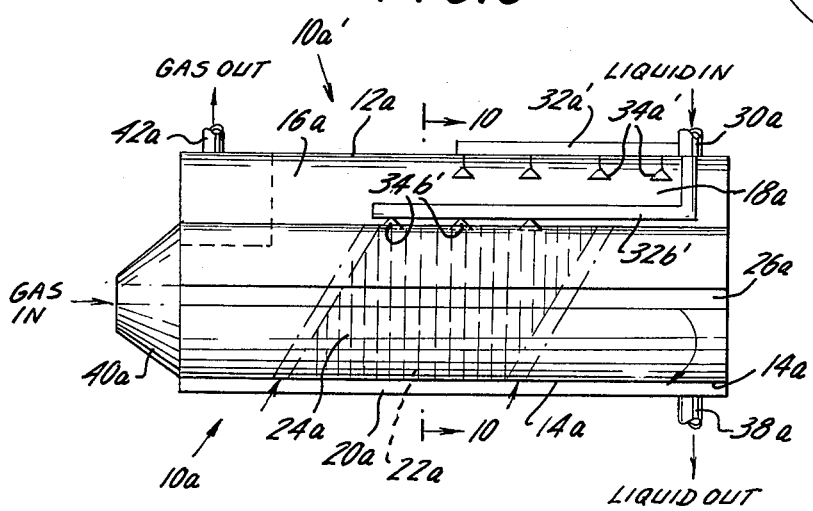
FIG. 9
FIG. 10

AIR POLLUTION CONTROL APPARATUS AND PROCESS

The present invention relates to an apparatus and a process for contacting first and second fluids. More particularly, this inventon relates to apparatus and process for scrubbing a gas, which is normally vented to the atmosphere, with a liquid in order to remove pollutants from the gas thereby reduce or substantially eliminate pollution of the atmosphere by such gas.

Environmental pollution control has become a topic of great concern to the world at large. The result is that a world-wide effort is now underway involving the expenditure of untold sums of money for research and development of environmental pollution control systems. One of the major areas of such research today involves the control and, possibly, substantial elimination of air pollution resulting from the venting of waste gases produced in industrial processes. The problem of air pollution has become exceedingly acute to industrial establishments in view of governmental regulations which have been enacted which impose stiff penalties for unlawful and indiscriminate polluting of the air.

Various types of gas cleaning systems have been developed. One of the most commonly used gas cleaning system is the so-called packed tower wherein scrubbing liquid is fed downwardly over packing material such as rings, cylinders, saddles, or the like and gas to be cleaned is fed counter-currently to the liquid and flows upwardly through the packing material. Such a technique has been found to be quite successful in separating out noxious and even poisonous gaseous components from the gas feed. However, such packed towers have not been particularly successful in removing solid particles or entrained liquid from gases. In order to overcome this shortcoming of packed towers, it is usually necessary to process the waste gases through various other pieces of equipment, such as filters and venturi scrubbers, cyclone separators and the like to remove these other solid and liquid pollutants before the gases can be vented to the atmosphere.

Although many different types of gas scrubbing equipment are known, it appears that there is no single unit or piece of equipment now available which is capable of removing solids, entrained liquid and noxious gaseous components from industrial waste gases.

In acccordance with the present invention, apparatus is provided which includes a single compact unit means for removing solids, entrained liquid and noxious gaseous pollutants from waste gases.

The apparatus of the present invention, which is especially adapted for the scrubbing of a gas with a liquid to remove pollutants from the gas, comprises an inner contact zone defining an inner fluid flow path; an outer contact zone disposed about the inner contact zone and defining an outer fluid flow path about said inner contact zone; first fluid feed means for introducing a first fluid into the inner contact zone; second fluid feed means for introducing a second fluid into contact with the first fluid; outlet means for first fluid; and outlet means for processed second fluid. The apparatus also includes an outer shell defining the outer periphery of the outer contact zone, and an inner shell, spaced from the outer shell, internal walls of which define the inner contact zone and the external walls of which define the inner periphery of the outer contact zone.

The above apparatus is designed for both counter-current and co-current operation.

The outer shell and inner shell may be positioned vertically or horizontally with respect to the ground in such a manner as to provide either a substantially vertical flow path or a substantially horizontal flow path for the fluids flowing in the outer contact zone and inner contact zone.

The outer contact zone is provided primarily for the removal of solid particulates and/or entrained liquid in the second fluid (gas) and functions as a gas expansion chamber and optionally as a gas cooling chamber.

The inner contact zone functions essentially in the same manner as a packed tower, and, in fact, in preferred embodiments will include a packing or surface contact material.

In addition, in accordance with the present invention, a process is provided for contacting first and second fluids, for example contacting a scrubbing liquid with a gas, which comprises providing a first, inner contact zone disposed within a second, outer contact zone, flowing a first fluid, such as a liquid, into the inner contact zone, flowing a second fluid, such as a gas, into contact with the first fluid in the inner contact zone, flowing second fluid into the outer contact zone, optionally flowing first fluid into the outer contact zone into contact with the second fluid and separately recovering first fluid and processed second fluid.

The above process may be carried out in a counter-current or co-current fashion as described herein, employing apparatus as described above.

The first fluid may comprise a scrubbing liquid and the second fluid may comprise a gas to be scrubbed substantially free of pollutants. A complete description of the above process will be set out in conjunction with the description of the accompanying drawings.

Reference to the accompanying drawings and the following description thereof will serve to further clarify the apparatus and the process of the invention.

FIG. 1 is a perspective view, partially broken away, of a preferred embodiment of the apparatus of the invention employed for carrying out counter-current gas-liquid scrubbing operations;

FIG. 2 is a schematic, cross-sectional view of the apparatus shown in FIG. 1 taken along the lines 2—2;

FIG. 3 is a cross-sectional view of the apparatus shown in FIG. 2 taken along the lines 3—3;

FIG. 4 is a schematic view of another embodiment of the apparatus of the invention for use in carrying out counter-current gas-liquid operations;

FIG. 5 is a cross-sectional view of the apparatus shown in FIG. 4 taken along the lines 5—5;

FIG. 6 is a perspective view of an apparatus in accordance with the present invention for use in carrying out co-current gas-liquid scrubbing operations;

FIG. 7 is a schematic, cross-sectional view of the apparatus shown in FIG. 6 taken along the lines 7—7;

FIG. 8 is a cross-sectional view of the apparatus shown in FIG. 7 taken along the lines 8—8;

FIG. 9 is a schematic, cross-sectional view of another embodiment of the apparatus of the invention employed in carrying out co-current gas-liquid scrubbing operations; and FIG. 10 is a cross-sectional view of the apparatus shown in FIG. 9 taken along the lines 10—10.

Referring now to the accompanying Figures wherein like parts are represented by like numerals in the several views, in FIGS. 1 to 3, there is shown a preferred apparatus of the invention which is designated generally by the numeral 10. The apparatus 10 includes an outer shell 12 and an inner shell 14. The inner shell 14 comprises a tubular or tower-like structure, which is disposed in the outer shell 10 so as to define an annular or outer contact zone 16 defined by the interior walls of the outer shell 12 and the exterior walls of the inner shell 14. The interior walls of the inner shell 14 define an inner contact zone 22 having a packed section 24 which may be packed with any conventional type of packing material as described herein, which packing is supported by perforated support plate or undergrid 35. The packing material may comprise metal or plastic rings, rods, saddles, glass rings, Raschig rings, porcelain rings, Berl saddles, Tellerettes, Pall rings, honeycomb or egg crate material or other conventional surface contact elements.

The inner shell 14 also includes an open or inlet area 26 which allows flow of fluid from the outer contact zone 16 into the inner contact zone 22. The lower portion of the outer contact zone comprises a liquid collection chamber 31.

The apparatus 10 also includes liquid inlet means 30 comprised of a conventional conduit such as a pipe, connected to the upper portion of the outer shell 12, and which includes spray headers 32a and 32b as shown. Spray header 32a includes one or more spray nozzles 34a for introducing scrubbing liquid into the annular or outer contact zone 16. Spray header 32b includes one or more spray nozzles 34b for introducing scrubbing liquid into the packed tower or inner contact zone 22. Other type of liquid feed means may be employed, such as a pipe or conduit which includes one or more slots for introducing liquid in sheet form. Regardless of the type of liquid feed means employed, such means should be positioned to effect distribution over substantially the entire outer and inner contact zones.

Liquid outlet means or conduit 38 is in communication with a lower portion of the outer contact zone and a lower portion of the inner contact zone, as shown. Gas inlet means 40, which may take the form of a conventional conduit, as shown, is connected to an upper portion of the outer contact zone 16 which functions as an expansion chamber as described below. Gas outlet means 42 is in communication with the upper portion of the inner contact zone 22, as shown.

Liquid overflow conduit 44 is connected to the outer contact zone immediately below the level of the packed section 24 of the inner contact zone 22, to ensure that the liquid level in the liquid collection chamber 31 will not rise above the undergrid 35.

The inner shell 14 and the outer shell 12 are preferably circular in cross-section. The inner shell 14 may be disposed concentrically to or eccentrically to the outer shell 12 so as to provide an outer flow path or outer contact zone 16 having a cross-sectional area which is substantially greater than the cross-sectional area of the gas inlet means 40. Thus, the second fluid (gas) flowing from the gas inlet means 40 into the outer contact zone 16 will expand resulting in a concomitant reduction in flow velocity thereof. As the gas in the outer contact zone decreases in flow velocity, solid particulates of 5 microns or larger separate from the gas by gravity.

The inner shell 14 is preferably disposed eccentrically within the outer shell 12 so as to provide essentially two connecting flow paths in the outer contact zone 16, namely an expansion flow passage 18 and a restricted flow passage 20. The restricted flow passage functions in a manner similar to a venturi scrubber. Thus, fluids flowing through the restricted flow passage, under centrifugal force, are subjected to increased pressure drop and turbulence thereby causing increased collision between the fluids and the components thereof. Fine solid particles such as below 5 microns in the gas collide with each other causing agglomeration of the particles into larger particles which are separated from the gas by gravity. Furthermore, the gas is thrown by cyclonic action, into contact with the walls defining the restricted flow passage. Liquid entrained in the gas will thereby be separated from the gas.

Where the inner shell 14 is disposed concentrically to the outer shell, gas flowing in the outer contact zone 16 will not undergo the turbulent flow and pressure drop produced in the restricted flow passage. Thus, collision of the solid particles will be reduced and agglomeration of such particles will therefore be reduced. The result is that particles of more than 5 microns will be removed.

Apparatus as described above is useful in the scrubbing of exhaust or waste gases with a liquid in order to remove solid, liquid, and gaseous pollutants from such gases. The scrubbing liquid may be water, or may be an aqueous stream that may be slightly alkaline or acidic, depending upon the nature of the pollutants in the gas. The apparatus of FIGS. 1 to 3 is designed for counter-current operation wherein a first fluid, namely a liquid, flows counter-currently with respect to a second fluid, namely a gas, in the packed tower or inner contact zone. However, as will be seen with respect to FIGS. 6 to 8, similar apparatus may be employed for carrying out co-current scrubbing operations.

The process of the invention employing the apparatus of FIGS. 1 to 3 can be carried out as follows.

It is assumed for illustrative purposes that the liquid employed is a scrubbing liquid comprised of an aqueous sodium carbonate solution and the gas is comprised of a waste or stack gas containing sulfur dioxide, carbon dioxide, oxygen and other components normally found in stack gases produced, for example, in smelting furnaces.

The gas outlet 42 is connected to a vacuum pump or suction fan, not shown, and the gas inlet 40 is connected by for example, a hose to a work area wherein the stack gases are produced.

The liquid inlet 30 is connected to scrubbing liquid supply source, not shown. the scrubbing liquid is fed from the supply source into the liquid inlet 30 into the spray headers 32a and 32b and finally through the nozzles 34a into the outer contact zone 16 including the expansion flow passage 18 and the restricted flow passage 20 and through the nozzles 34b into the inner contact chamber 22. Stack gases are then drawn by means of the vacuum pump into the gas inlet 40 and thence into the expansion flow passage 18 of the outer contact zone 16, where the gases are forced to flow around the outer contact zone at a sufficiently high speed to impart a centrifugal spin to the gas stream. As the gas enters the expansion flow passage 18, the gases expand and the velocity thereof is reduced, and the gases contact the walls defining such outer contact zone.

The liquid may be introduced into the inner contact zone and not into the outer contact zone. However, it is preferred that liquid be introduced into the outer contact zone as well. The liquid in the outer contact zone wets the gas and cools the same thereby reducing the volume of gas required to be handled either in the inner contact zone or by gas recovery means. Furthermore, reduction of the volume of gas allows use of smaller suction or blowing means for moving the gas through the apparatus. In addition, contact of the gas by the liquid in the outer contact zone helps effect removal of solid particles of under 5 microns in size.

As the wetted gas stream flows into the restricted flow passage 20, its velocity is increased due to the restricted flow space and it is subjected to a corresponding pressure drop and increased turbulence. During this period of turbulence, liquid particles and solid particles in the wet gases collide with one another, thereby resulting in agglomeration of a significant portion of fine particles in the gases. The resulting agglomerated particles separate from the gases and drop and into the liquid collection zone 31. At this stage, substantially all (over 99%) of solid particles of over 5 microns and 90% or more of solid particles of less than 5 microns as well as entrained liquid are removed from the gases.

The cooled gas stream from which solid particles have been removed is then drawn into the open area 26 and into the lower portion of the inner contact zone 22. The gas stream is then drawn up through the packed section 24 counter-currently to and into contact with the scrubbing liquid. The liquid flowing into the inner contact zone 22 contacts the packing material therein and is broken up into thin liquid films. The gas contacts the thin liquid films, and gaseous pollutants, such as sulfur dioxide, which have an affinity for the liquid, such as are soluble in or react with the liquid, are absorbed in the liquid. The gas, substantially free of solid, liquid and gaseous pollutants, is then drawn out through the gas outlet 42 and may be vented to the atmosphere without polluting the same. The liquid including solid, liquid and gaseous pollutants removed from the gas, is collected in liquid collection chamber 31 and removed through liquid outlet 38.

It will be appreciated that the input flow rate and velocity of the gas flowing into the outer contact zone and the volume of the outer contact zone will be such as to provide the desired centrifugal spin and cyclonic action. For example, where the cross-sectional area of the outer contact zone is 16 ft$^2$, the gas may be introduced at a flow rate of 10,000 scfm.

Another embodiment of the apparatus of the invention for use in counter-current gas scrubbing operations is shown in FIGS. 4 and 5. In the embodiment of FIGS. 4 and 5, the apparatus is designated by the numeral 10a. The outer shell 12a and the inner shell 14a are horizontally disposed, and eccentrically positioned with respect to each other, as shown. The outer shell 12a includes outer contact zone 16a comprised of expansion flow passage 18a and restricted flow passage 20a. The inner shell includes inner contact zone 22a which contains packed section 24a and open area 26a to allow flow of fluids into and out from the inner contact zone.

Liquid feed means 30a includes header 32a' and spray nozzles 34a' for introducing liquid into the outer contact zone and header 32b' and spray nozzles 34b' for introducing liquid into the inner contact zone. Liquid outlet 38a and gas inlet 40a are connected to the outer contact zone and gas outlet 42a is connected to the inner contact zone, as shown.

Operation of the apparatus of FIGS. 4 and 5 is essentially the same as the apparatus of FIGS. 1 to 3.

The apparatus 10' shown in FIGS. 6 to 8 corresponds essentially to the apparatus shown in FIGS. 1 to 3. However, apparatus 10' is employed in carrying out co-current operations. Accordingly, gas inlet 40 is in communication with the inner contact zone 22 and gas outlet 42 is in communication with outer contact zone 16, as shown.

In carrying out co-current operation, the gas outlet 42 is connected to a suction source, such as a suction fan, and the gas inlet is connected by a conduit to a work area where gases to be scrubbed are produced.

The liquid inlet 30 is connected to scrubbing liquid supply source, not shown. The scrubbing liquid is fed from the supply source into the liquid inlet 30 into the spray headers 32a and 32b and finally through the nozzles 34a into the outer contact zone 16 including the expansion flow passage 18 and the restricted flow passage 20 and through the nozzles 34b into the inner contact chamber 22. Gases are then drawn by means of the vacuum pump into the gas inlet 40 and thence into the inner contact zone 16. The gas stream is drawn through the packed section 24 co-currently to and into contact with the scrubbing liquid. The liquid flowing into the inner contact zone 22 contacts the packing material therein and is broken up into thin liquid films. The gas contacts the thin liquid films, solids are removed by the packing, and gaseous pollutants are absorbed in the liquid, while the gas is cooled by the liquid. The cooled and wetted gas stream from which gaseous pollutants have been removed is then drawn into the open area 26 and out of the lower portion of the inner contact zone 22 into the outer contact zone. As the gas stream enters the expansion flow passage 18, the gases expand and the velocity thereof is reduced. The gases flow around the outer contact zone 16 and contact the walls defining such outer contact zone. The liquid stream flowing into the outer contact zone 16 contacts the gases and further wet and cool the gases.

As the wetted gas stream flows into the restricted flow passage 20, its velocity is increased due to the restricted flow space and it is subjected to a corresponding pressure drop and increased turbulence. During this period of turbulence, liquid and solid particulates entrained in the wet gases collide with one another, thereby resulting in agglomeration of such particles. The resulting agglomerated particles separate from the gases and drop into the liquid collection zone 31. The gas, substantially free of solid, liquid and gaseous pollutants, is then drawn out through the gas outlet 42 and may be vented to the atmosphere without polluting the same. The liquid including solid, liquid and gaseous pollutants removed from the gas, is collected in liquid collection chamber 31 and removed through liquid outlet 38.

As indicated, with respect to FIGS. 1 to 5, the inner shell 14 may be disposed concentrically to the outer shell 12. However, in such case, removal of liquid entrained in the gas will be substantially reduced.

Another embodiment of the apparatus of the invention for use in co-current gas scrubbing operations is shown in FIGS. 9 and 10. In the embodiment of FIGS. 9 and 10, the apparatus is designated by the numeral 10a'. The outer shell 12a and the inner shell 14a are horizontally disposed, and eccentrically positioned with respect to each other, as shown. The outer shell 12a includes outer contact zone 16a comprised of expansion flow passage 18a and restricted flow passage 20a. The inner shell includes inner contact zone 22a which contains packed section 24a and open area 26a to allow flow fluids into and out from the inner contact zone.

Liquid feed means 30a includes header 32a' and spray nozzles 34a' for introducing liquid into the outer contact zone and header 32b' and spray nozzles 34b' for introducing liquid into the inner contact zone. Liquid outlet 38a and gas outlet 42a are connected to the outer contact zone and gas inlet 40a is connected to the inner contact zone, as shown.

Operation of the apparatus of FIGS. 9 and 10 is essentially the same as the apparatus of FIGS. 6 to 8.

Generally, materials of construction for the inner and outer shells as well as the perforated support for the packing material may be formed of any rigid material which will be resistant to corrosion and the corrosive materials being treated. For example, these members may be formed of corrosion resistant metals such as stainless steel, plastics such as polyvinyl chloride, ABS and the like.

In each of the above embodiments, the second fluid (gas) moving means will preferably comprise suction means connected to the second fluid outlet means. However, it will be understood that blowing means, such as a fan or blower, may be connected to the gas inlet means, and may be employed alone or in combination with the suction means, connected to the gas outlet means, where desired.

The apparatus and process of the invention are particularly applicable for use in the scrubbing of waste industrial gases such as produced in smelting, coking and other foundry operations, in the burning of coal and oil, including high sulfur coals and oils, in pickling operations, pulp digestion processes and the like.

What is claimed is:

1. A process for removing both solid and gaseous pollutants from a gas which comprises:
    a. providing a first inner contact zone eccentrically disposed within a second outer contact zone, said inner contact including packing material therein, said inner contact zone dividing said outer contact zero into an expansion flow passage and a restricted flow passage;
    b. flowing a scrubbing liquid into both said inner contact zone and said outer contact zone;
    c. flowing a gas sequentially along and through said inner and said outer contact zones, said gas being circulated in said outer contact zone and passing sequentially through said expansion flow passage and said restricted flow passage, and solid pollutants being removed from said gas in said outer contact zone and said gaseous pollutants being removed from said gas in said inner contact zone; and
    d. removing said liquid and gas from said zones.

2. The process in accordance with claim 1 which comprises flowing said gas at a predetermined flow rate and velocity, into said inner contact zone co-currently to and into contact with said liquid, whereby at least a portion of said gaseous components in said gas having an affinity for said liquid are transferred to said liquid, and thereafter flowing said gas into said expansion flow passage thereby causing said gas to expand, resulting in a concomitant decrease in gas flow velocity.

3. The process in accordance with claim 1 which comprises flowing said gas at a predetermined flow rate and velocity for a predetermined volume of the outer contact zone, into said outer contact zone; allowing said gas to expand and the flow velocity of said gas to decrease in said expansion flow passage thereby causing solid particles suspended in said gas to be removed from said gas, and further creating a pressure drop on said gas in said restricted flow passage thereby causing small particles and liquid entrained in said gas to be removed from said gas; and thereafter flowing said gas into said inner contact zone counter-currently to and into contact with said liquid whereby at least a portion of said gaseous components in said gas having an affinity for said liquid are transferred to said liquid.

4. Apparatus for use in removing both solid and gaseous pollutants from a gas comprising, in combination:
    an inner shell defining an inner contact zone having an inner fluid flow path therethrough;
    packing material disposed in said inner contact zone;
    an outer shell disposed about said shell and having end walls, the space between said inner and outer shells defining an outer contact zone having an outer fluid flow path therethrough disposed about said inner shell and communicating with said inner flow path; said inner shell being disposed eccentrically within said outer shell so that said inner shell divides said outer contact zone into an expansion flow passage and a restricted flow passage;
    first fluid feed means connected with said shells for introducing a scrubbing liquid into both said inner and outer contact zones;
    second fluid feed means connected with one of said shells including gas inlet means for circulating a gas sequentially along and through said inner and outer contact zones in a manner such that said gas is circulated in said outer contact zone so that it passes sequentially through both said expansion flow passage and said restricted flow passage;
    outlet means for said liquid connected with at least one of said shells; and
    outlet means for said gas connected with the one of said shells to which said second fluid feed means is not connected, one of said gas inlet and outlet means being connected with said inner shell without direct communication with said outer zone.

5. The apparatus in accordance with claim 4 wherein said inner shell is of circular cross-section and said outer shell is of circular cross-section.

6. The apparatus in accordance with claim 4 wherein said gas inlet means is in direct communication with said outer contact zone, said outlet means for said gas is in direct communication with said inner contact zone, said first fluid feed means is in communication with said inner contact zone and said outlet means for said liquid is in communication with said outer contact zone.

7. The apparatus in accordance with claim 4 wherein said gas inlet means is in direct communication with said contact zone, said outlet means for said gas is in communication with said outer contact zone, said first fluid feed means is in communication with said inner contact zone and said outlet means for said liquid is in communication with said outer contact zone.

8. The apparatus in accordance with claim 4 wherein said outer shell and said inner shell are vertically disposed, so that said liquid and said gas flow in a substantially vertical direction therein.

9. The apparatus of claim 4 wherein said expansion flow passage has a cross-sectional area greater than the cross-sectional area of said gas inlet means.

* * * * *

UNITED STATES PATENT AND TRADEMARK OFFICE
CERTIFICATE OF CORRECTION

PATENT NO. : 3,944,402
DATED : March 16, 1976
INVENTOR(S) : Paul Cheremisinoff

It is certified that error appears in the above-identified patent and that said Letters Patent are hereby corrected as shown below:

Claim 1, line 42, "zero" should read --zone--.

Claim 7, line 56, after "said" insert the word --inner--

Signed and Sealed this eighth Day of June 1976

[SEAL]

Attest:

RUTH C. MASON
Attesting Officer

C. MARSHALL DANN
Commissioner of Patents and Trademarks